United States Patent
Lucey et al.

(10) Patent No.: US 9,958,096 B2
(45) Date of Patent: May 1, 2018

(54) SPLIT TEST BOOT

(71) Applicant: Franklin Fueling Systems, Inc., Madison, WI (US)

(72) Inventors: Chris Lucey, Madison, WI (US); Bill Nelson, Sun Prairie, WI (US); Lorraine Sabo, Sun Prairie, WI (US); Larry Wickersham, McFarland, WI (US)

(73) Assignee: Franklin Fueling Systems, LLC, Madison, WI (US)

( * ) Notice: Subject to any disclaimer, the term of this patent is extended or adjusted under 35 U.S.C. 154(b) by 1157 days.

(21) Appl. No.: 13/628,609

(22) Filed: Sep. 27, 2012

(65) Prior Publication Data

US 2013/0076020 A1    Mar. 28, 2013

Related U.S. Application Data

(60) Provisional application No. 61/540,375, filed on Sep. 28, 2011, provisional application No. 61/540,493, (Continued)

(51) Int. Cl.
*F16L 21/06* (2006.01)
*F16L 19/065* (2006.01)
*F16L 25/14* (2006.01)

(52) U.S. Cl.
CPC ............. *F16L 19/065* (2013.01); *F16L 21/06* (2013.01); *F16L 25/14* (2013.01)

(58) Field of Classification Search
CPC .......... F16L 21/00; F16L 21/06; F16L 21/065
See application file for complete search history.

(56) References Cited

U.S. PATENT DOCUMENTS 3,078,108 A * 2/1963 Smith ................... F16L 21/06
285/104
4,111,234 A    9/1978 Wells et al.
(Continued)

FOREIGN PATENT DOCUMENTS

FR       2 867 829      9/2005
WO       98/46926       10/1998

OTHER PUBLICATIONS

Partial International Search Report dated Apr. 16, 2013.
(Continued)

*Primary Examiner* — Gilbert Lee
(74) *Attorney, Agent, or Firm* — Faegre Baker Daniels LLP

(57) ABSTRACT

A boot assembly that reliably seals the secondary containment area utilizing a split boot device that can be installed without disconnecting the primary piping is disclosed. The seal includes first and second containment housings, each supporting a pair of partial ring shaped seals. The containment housings can be positioned about the primary and secondary pipes from opposing sides thereof so that disconnection of the primary pipe is not required to secure the seal in place. A clamp secures the first containment housing relative to the second containment housing in a secured position in which a first pair of partial ring seals associated with the first containment housing and a second pair of partial ring shaped seals associated with the second containment housing cooperate to form a pair of continuous ring shaped sealing surfaces including a first continuous ring shaped sealing surface including one of the first pair of partial ring shaped seals and one of the second pair of partial ring shaped seals, and a second continuous ring shaped sealing surface including a second one of the first pair of
(Continued)

partial ring shaped seals and a second one of the second pair of partial ring shaped seals.

19 Claims, 10 Drawing Sheets

Related U.S. Application Data filed on Sep. 28, 2011, provisional application No. 61/651,285, filed on May 24, 2012.

(56) References Cited

U.S. PATENT DOCUMENTS

| | | | |
|---|---|---|---|
| 5,004,275 A * | 4/1991 | Miller | F16L 55/17 138/99 |
| 5,066,053 A * | 11/1991 | Miller | F16L 55/17 277/616 |
| 5,297,896 A | 3/1994 | Webb | |
| 5,398,976 A | 3/1995 | Webb | |
| 5,527,130 A | 6/1996 | Webb | |
| 5,590,981 A | 1/1997 | Osborne | |
| 5,692,544 A * | 12/1997 | Friedrich | F16L 55/178 138/109 |
| 5,865,216 A | 2/1999 | Youngs | |
| 5,911,155 A | 6/1999 | Webb | |
| 6,029,505 A | 2/2000 | Webb | |
| 6,116,817 A | 9/2000 | Osborne | |
| 2005/0248098 A1 | 11/2005 | Sisk et al. | |
| 2011/0025048 A1 | 2/2011 | Webster et al. | |
| 2012/0049509 A1 | 3/2012 | Lininger et al. | |

OTHER PUBLICATIONS

International Search Report dated Aug. 1, 2013 in corresponding International Application No. PCT/US2012/057547.

OPW Fueling Containment Systems, "Next-Generation OPW FlexWorks Pipe", Sep. 2011.

* cited by examiner

FIG_5

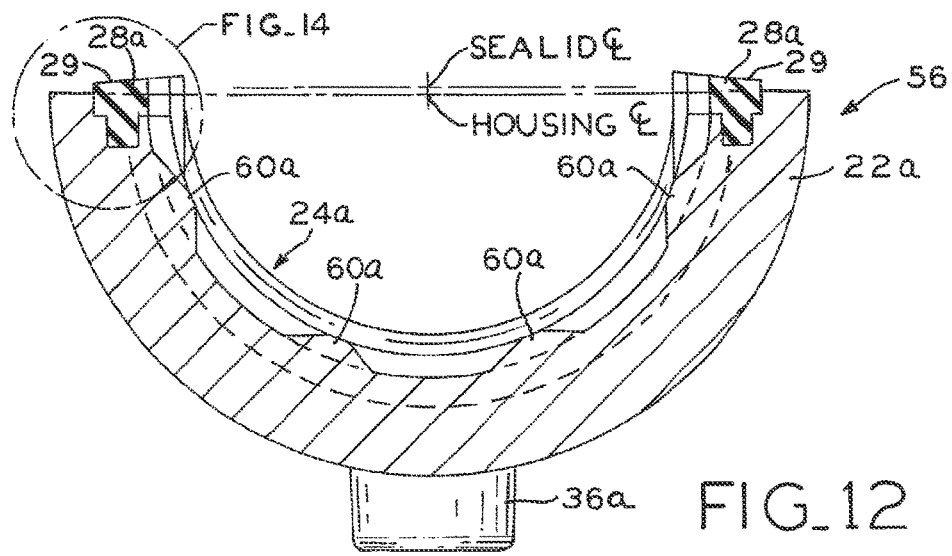
FIG_12
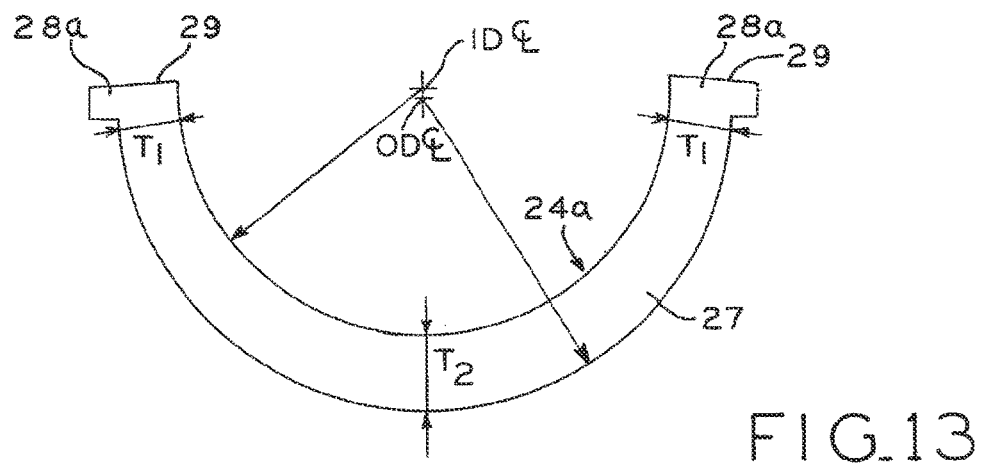
FIG_13
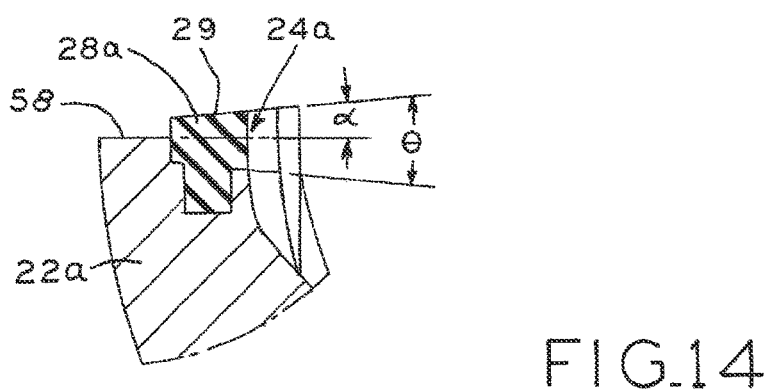
FIG_14

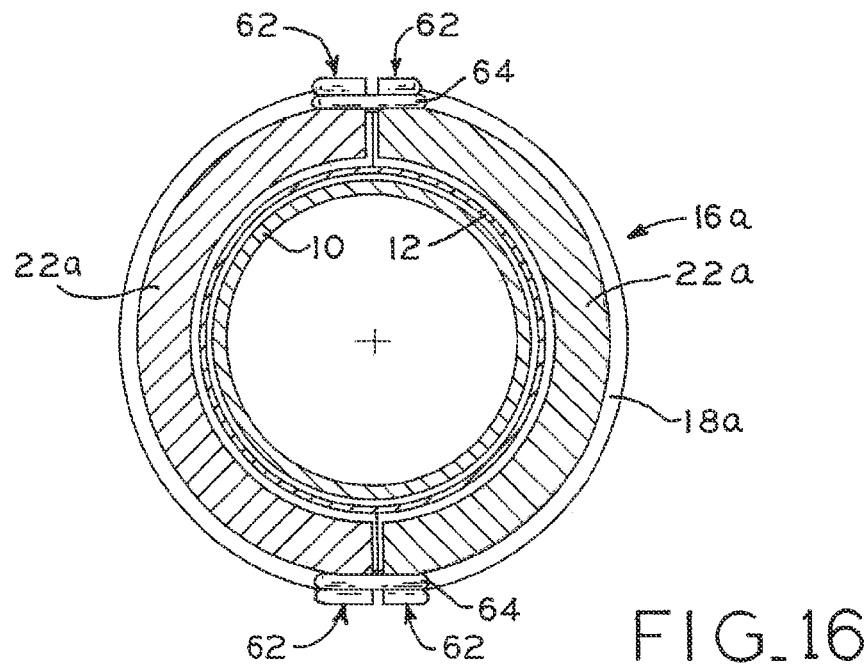
FIG_16
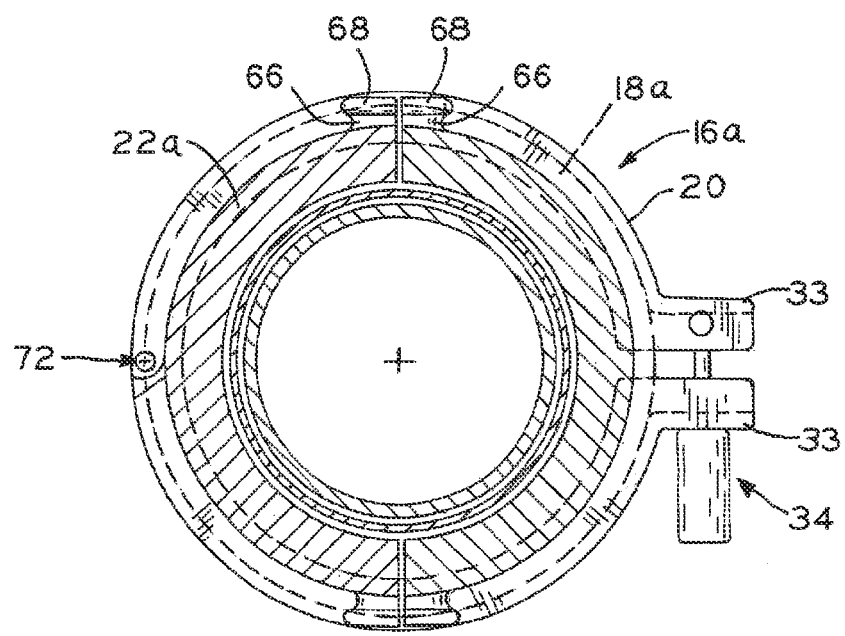
FIG_17

SPLIT TEST BOOT

CROSS REFERENCE TO RELATED APPLICATIONS

This application is related to and claims the benefit under Title 35, U.S.C. 119(e) of U.S. Provisional Patent Application Ser. Nos. 61/540,493, entitled SPLIT TEST BOOT FOR TESTING THE SECONDARY CONTAINMENT FUEL CONTAINMENT PIPING filed on Sep. 28, 2011; 61/540,375 entitled SPLIT TEST BOOT FOR TESTING THE SECONDARY CONTAINMENT FUEL CONTAINMENT PIPING filed Sep. 28, 2011 and 61/651,285 entitled SPLIT TEST BOOT FOR TESTING THE SECONDARY CONTAINMENT FUEL CONTAINMENT PIPING filed May 24, 2012, the entire disclosures of which are hereby expressly incorporated by reference herein.

BACKGROUND/SUMMARY

The present disclosure describes a novel test boot for sealing the secondary containment of a fuel containment piping system with a split boot assembly that can be installed without disconnecting the primary piping.

Vehicle fuel is commonly conveyed from an underground storage tank to a fuel dispenser through a secondarily contained fuel pipe. The secondarily contained fuel pipe typically extends from a containment sump located above the underground storage tank to a containment sump located below the dispenser. Within either the dispenser sump or the tank sump, the secondary containment pipe is terminated in one of two ways either a closed type or an open type, as further described below. A primary/secondary piping arrangement as well as a sealing system utilized in conjunction with the same is disclosed in U.S. patent application Ser. No. 12/324,461, which published as U.S. Patent Application Publication No. 2009/0136286, entitled ENTRY BOOT, the entire disclosure of which is hereby expressly incorporated by reference herein. Other primary/secondary piping arrangements as well as sealing systems utilized in conjunction with the same are disclosed in U.S. Pat. Nos. 7,758,084 and 7,523,962, both entitled CONNECTION BETWEEN A PIPE AND A WALL, the entire disclosures of which are hereby expressly incorporated by reference herein.

Secondary containment monitoring can be of a closed type, using a termination boot to seal the end of the secondary containment area for leak detection monitoring using a VPH method. VPH monitoring is an acronym for vacuum, pressure or hydrostatic monitoring. One of these three methods is typically used to monitor the closed volume between the primary and secondary pipes with a monitoring means that will indicate to a station owner or operator a potential leak of the primary piping system. An exemplary method and apparatus for monitoring for leaks is disclosed in U.S. Pat. Nos. 7,334,456 and 7,051,579, both entitled METHOD AND APPARATUS FOR CONTINUOUSLY MONITORING INTERSTITIAL REGIONS IN GASOLINE STORAGE FACILITIES AND PIPELINES, the entire disclosures of which are hereby expressly incorporated by reference herein.

Secondary containment monitoring can also be of an open type allowing any fluid that may have leaked into the secondary containment pipe (e.g., from a leak in the primary pipe) to flow into the dispenser and/or tank sumps. A sensor located in the sump provides indication of a potential leak of the primary piping system. In this method, the ends of the secondary containment system are typically sealed on a periodic basis and verified by a service contractor to be leak tight using a VPH method.

Whether utilizing a closed or open type system for monitoring a secondary containment piping system, a boot is installed to seal off the end of the secondary containment pipe in at least certain circumstances.

Certain boot designs utilize a cylindrical, elastomeric boot that is installed onto the secondary piping system prior to the primary fitting connections being made to the ends of the piping system. Using this embodiment, one end of the elastomeric cylinder is clamped to the primary pipe and the other end clamped to the secondary pipe to seal off the secondary containment volume. While this is typically done with a cylindrical, elastomeric material, similar embodiments are also utilized. In order to replace the boot following damage or normal aging wear, the primary piping system must be disconnected in order to install a new boot.

An improvement to this method is to utilize a split boot arrangement that allows both halves of a boot to be attached on either side of the pipe and subsequently sealed to the piping system in such a way that the secondary containment area is contained.

The disclosed embodiment demonstrates a boot assembly that reliably seals the secondary containment area utilizing a split boot device that can be installed without disconnecting the primary piping. The seal includes first and second containment housings, each supporting a pair of partial ring shaped seals. The containment housings can be positioned about the primary and secondary pipes from opposing sides thereof so that disconnection of the primary pipe is not required to secure the seal in place. A clamp secures the first containment housing relative to the second containment housing in a secured position in which a first pair of partial ring seals associated with the first containment housing and a second pair of partial ring shaped seals associated with the second containment housing cooperate to form a pair of continuous ring shaped sealing surfaces including a first continuous ring shaped sealing surface including one of the first pair of partial ring shaped seals and one of the second pair of partial ring shaped seals, and a second continuous ring shaped sealing surface including a second one of the first pair of partial ring shaped seals and a second one of the second pair of partial ring shaped seals.

In one form thereof, the present disclosure provides a seal for sealing the interstitial space formed between a primary pipe and a secondary pipe positioned about the primary pipe. The seal of this form of the present disclosure includes a first containment housing supporting a first seal, the first seal comprising a first pair of partial ring shaped seals, the first pair of partial ring shaped seals each forming a partial ring. The seal of this form of the present disclosure further includes a second containment housing supporting a second seal, the second seal comprising a second pair of partial ring shaped seals. A clamp sized and shaped to secure the first containment housing relative to the second containment housing in a secured position in which the first pair of partial ring shaped seals of the first seal and the second pair of partial ring shaped seals of the second seal cooperate to form a pair of continuous ring shaped sealing surfaces comprising a first continuous ring shaped sealing surface comprising a first one of the first pair of partial ring shaped seals and a first one of the second pair of partial ring shaped seals, and a second continuous ring shaped sealing surface comprising a second one of said first pair of partial ring shaped seals and a second one of said second pair of partial ring shaped seals may be provided. In the secured position the first containment housing and the second containment housing define a containment housing longitudinal axis.

In alternative forms of the present disclosure, the first pair of partial ring shaped seals may span a first gasket and a second gasket, with the first pair of partial ring shaped seals joined by the first gasket and the second gasket. Further, the second pair of partial ring shaped seals may span a third gasket and a fourth gasket, the second pair of partial ring shaped seals joined by the third gasket and the fourth gasket. In this alternative form of the present disclosure, the clamp may sealingly engage the first gasket to the third gasket and the second gasket to the fourth gasket to form the pair of continuous ring shaped sealing surfaces.

In embodiments of the present disclosure, the first gasket may comprise a first gasket seal surface and first gasket opposite surface opposite the first gasket seal surface, the first gasket seal surface and the first gasket opposite surface forming an angle oriented so that a thickness of the first gasket increases radially inwardly toward the containment housing longitudinal axis. The second, third and fourth gaskets may share the same configuration as previously described with respect to the first gasket.

In embodiments of the present disclosure, the first continuous ring shaped sealing surface may define a first radius measured from the containment housing longitudinal axis and the second continuous ring shaped sealing surface may define a second radius measured from the containment housing longitudinal axis, with the first radius being smaller than the second radius so that the first continuous ring shaped sealing surface and the second continuous ring shaped sealing surface can simultaneously sealingly engage two different sized pipes.

In certain alternative embodiments, each of the first pair of partial ring shaped seals and/or the second pair of partial ring shaped seals may have differing thicknesses such that a thickness of such seals at a certain point is greater than a thickness of these seals at another point. The differential thicknesses may be positioned such that the increased thicknesses are positioned 180° about the containment housing longitudinal axis from each other when the first containment housing and the second containment housing are in the secured position. In certain alternative embodiments, either or both of the first and second pair of partial ring shaped seals may define an inner diameter and an outer diameter, with the inner diameter eccentric to the outer diameter to form the aforementioned differential thicknesses.

In certain forms of the present disclosure, the pairs of partial ring shaped seals may comprise O-rings, or dual lobed sealing rings presenting a pair of sealing surfaces.

In alternative forms of the present disclosure, the first and second containment housings may include external radial protrusions having opposing ramp surfaces such that a thickness of the external radial protrusions increases radially inwardly toward the containment housing longitudinal axis. In such forms of the present disclosure, a clamp comprising a pair of interior ramp surfaces complementary to said opposing surfaces of the external radial protrusions may be utilized to clamp against the opposing ramp surfaces of the exterior radial protrusions to both axially and radially align the first containment housing with the second containment housing as the clamp secures the first containment housing and the second containment housing in the secured position.

In certain forms of the present disclosure, one or both of the containment housings may include a cavity sized to receive the associated pair of partial ring shaped seals. The cavity may include a bevelled surface to accommodate an angled gasket oriented so that a thickness of the gasket increases radially inwardly toward the containment housing longitudinal axis.

One or both of the containment housings of the present disclosure may include a fitting extending from the exterior surface of the containment housing and connected in fluid communication by a channel extending through a wall of the containment housing to an interior surface of the containment housing, the channel terminating at a location intermediate the first continuous ring shaped sealing surface and the second continuous ring shaped sealing surface.

In alternative forms of the present disclosure, one or both of the containment housings may include a locator extending from an interior wall of the containment housing toward the containment housing longitudinal axis, the locator extending further inwardly toward the containment housing longitudinal axis than one of the continuous ring shaped sealing surfaces.

In alternative forms of the present disclosure, the first containment housing includes a first pair of T-shaped protrusions extending from an exterior wall of the first containment housing and the second containment housing may include a second pair of T-shaped protrusions extending from an exterior wall of the second containment housing. The seal of this form of the present disclosure may further includes a first pair of O-rings, each of the first pair of O-rings positioned about one of the first pair of T-shaped protrusions and one of the second pair of T-shaped protrusions to hingedly connect the first containment housing to the second containment housing. In alternative forms of the present disclosure, the first containment housing may include a third pair of T-shaped protrusions extending from the exterior wall of the first containment housing and the second containment housing may include a fourth pair of T-shaped protrusions extending from the exterior wall of the second containment housing. In these alternative forms of the present disclosure, the seal may further comprise a second pair of O-rings, each of the second pair of O-rings selectively positioned about one of the third pair of T-shaped protrusions and one of the fourth pair of T-shaped protrusions to selectively secure the first containment housing to the second containment housing.

In one form of the present disclosure, the seal disclosed herein may be utilized in combination with a fueling station including a primary pipe fluidly connecting an underground storage tank with a fuel dispenser and traversing an underground storage tank sump associated with the underground storage tank and a fuel dispenser sump associated with the fuel dispenser. In this form of the present disclosure, a secondary pipe providing secondary containment of the primary pipe may extend between the underground storage tank sump and the fuel dispenser sump. In this form of the present disclosure, the clamp secures the first containment housing relative to the second containment housing in the secured position so that the first continuous ring shaped sealing surface seals against the primary pipe and the second continuous ring shaped sealing surface seals against the secondary pipe.

In one form of the present disclosure, the first containment housing may extend no more than 180° about the containment housing longitudinal axis and the second containment housing may extend no more than 180° about the containment housing longitudinal axis.

In an alternative form of the present disclosure, an apparatus for conveying fluid includes a primary pipe, a secondary pipe surrounding the primary pipe and forming interstitial space therebetween and a split boot assembly. In this form of the present disclosure, the split boot assembly may include a first split boot half having an inner wall supporting a first pair of half ring seals and a second split boot having an inner wall supporting a second pair of half ring seals. The split boot assembly of this form of the present disclosure may further include a clamp engaging the first split boot half and the second split boot half to clamp the split boot assembly to the primary pipe and the secondary pipe such that the first pair of half ring seals seals against both the primary pipe and the secondary pipe and the second pair of half ring seals seals against both the primary pipe and the secondary pipe to thereby seal the interstitial space.

In certain alternative embodiments, the clamp may comprise a tapered clamp engaging a tapered outer wall of the first split boot half and a tapered outer wall of the second split boot half to align the first split boot half to the second split boot half both radially and axially when the tapered clamp clamps the split boot assembly to the primary pipe and the secondary pipe.

In certain forms of the present disclosure, the first pair of half ring seals and the second pair of half ring seals may comprise O-rings or dual lobed sealing rings comprising a pair of radially inwardly projecting sealing surfaces.

In alternative forms of the present disclosure, one or both of the first split boot half and second split boot half may include a locator extending from an interior wall of the split boot half to a radially inward position, the locator extending further inwardly than an outer diameter of the secondary pipe.

In alternative forms of the present disclosure, the first split boot half may be hingedly connected to the second split boot half. In exemplary embodiments, the first split boot half may include a pair of first split boot half T-shaped extensions and the second split boot half may include a pair of second split boot half T-shaped extensions. The apparatus of this form of the present disclosure may further include a pair of O-rings, each of the O-rings positioned about one of the pair of first split boot half T-shaped extensions and one of the pair of second split boot half T-shaped extensions to hingedly connect the first split boot half to the second split boot half.

In certain alternative embodiments, each of the first pair of half ring seals and/or the second pair of half ring seals may have different thicknesses such that a thickness of such seals at a certain point is greater than a thickness of these seals at another point. The differential thicknesses may be positioned such that the increased thicknesses are positioned 180° about a longitudinal axis of the primary pipe from each other. In certain alternative embodiments, either or both of the first pair of half ring seals and the second pair of half ring seals may define an inner diameter and an outer diameter, with the inner diameter eccentric to the outer diameter.

In alternative forms of the present disclosure, the first pair of half ring seals may span a first gasket and a second gasket, with the first pair of half ring seals joined by the first gasket and the second gasket. Further, the second pair of half ring seals may span a third gasket and a fourth gasket, the second pair of half ring seals joined by the third gasket and the fourth gasket. In this alternative form of the present disclosure, the clamp may sealingly engage the first gasket to the third gasket and the second gasket to the fourth gasket to form a pair of continuous ring shaped sealing surfaces.

In embodiments of the present disclosure, the first gasket may comprise a first gasket seal surface and a first gasket opposite surface opposite the first gasket seal surface, the first gasket seal surface and the first gasket opposite surface forming an angle oriented so that a thickness of the first gasket increases radially inwardly toward a longitudinal axis of the primary pipe. The second, third and fourth gaskets may share the same configuration as previously described with respect to the first gasket.

In certain forms of the present disclosure, one or both of the first split boot halves may include a cavity sized to receive the associated pair of half ring seals. The cavity may include a bevelled surface to accommodate an angled gasket oriented so that a thickness of the gasket increases radially inwardly toward the containment housing longitudinal axis.

The split boot assembly may further include a fitting extending from an exterior surface of the split boot assembly and connected in fluid communication by a channel through a wall of the split boot assembly to an interior surface of the split boot assembly to fluidly connect the fitting to the interstitial space formed between the primary pipe and the secondary pipe.

In a further alternative form of the present disclosure, a sealing ring includes a first gasket section, a second gasket section, and a partial ring spanning the first gasket section and the second gasket section and extending through an arc about a longitudinal axis spaced from the partial ring seal. In this form of the present disclosure, the partial ring seal includes a first radial thickness perpendicular to the longitudinal axis adjacent to the first gasket section and a second radial thickness perpendicular to the longitudinal axis and located between the first gasket section and the second gasket section, the second radial thickness being greater than the first radial thickness.

In an alternative form of the present disclosure, the second, increased thickness is midway between the first gasket section and the second gasket section. The sealing ring may further include a second partial ring seal spanning the first gasket section and the second gasket section and extending through the same arc as the first partial ring seal. In an alternative form of the present disclosure, one or both of the first gasket section and the second gasket section may include a first face and an opposing second face, with the first face diverging from the second face in a radially inward direction toward the longitudinal axis so that the first face has an increasingly greater thickness toward the longitudinal axis.

The above and other features of the present disclosure, which alone or in any combination may comprise patentable subject matter, will become apparent from the following description and the attached drawings.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein:

FIG. 12 is another sectional view of the split boot half illustrated in FIGS. 7-11;

FIG. 13 is an axial elevational view of a partial sealing ring of the present disclosure;

FIG. 14 is a fragmented view illustrating a partial sealing ring connected to a containment housing in accordance with the present disclosure;

FIG. 16 is a cross-sectional view of the assembly illustrated in FIG. 15;

FIG. 17 is an alternative cross-sectional view illustrating the assembly shown in FIG. 15;

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

The present disclosure provides a seal useable for sealing the interstitial space formed between a primary pipe and a secondary pipe positioned about the primary pipe.

Figure 1:
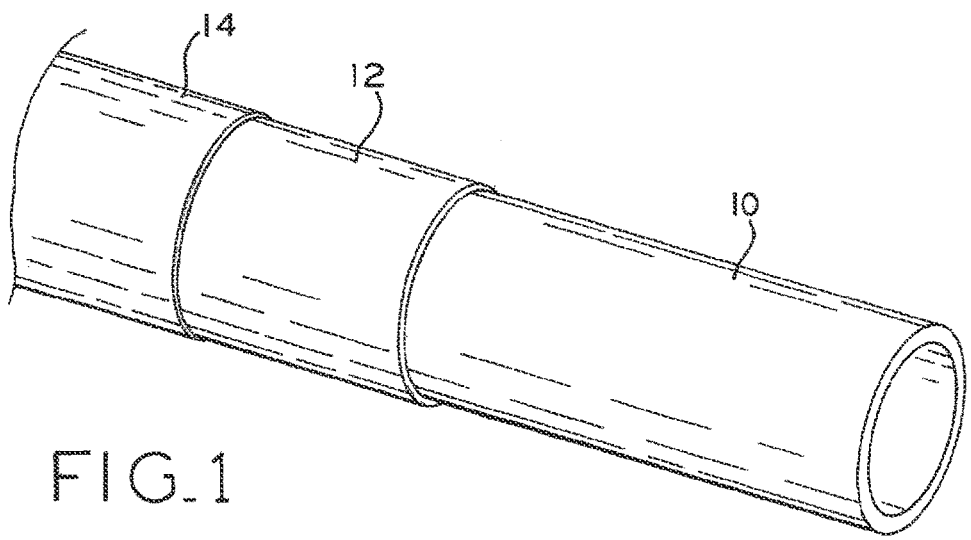
FIG. 1 is a partial perspective view illustrating a double walled pipe.

A typical fuel piping system is shown in FIG. 1. Primary pipe 10 is centrally located within an arrangement of coaxially located pipes. Adjacent to primary pipe 10 is secondary containment pipe 12. Scuff guard 14 is also depicted and serves to protect the secondary pipe from scratches that could occur during installation.

Figure 2:
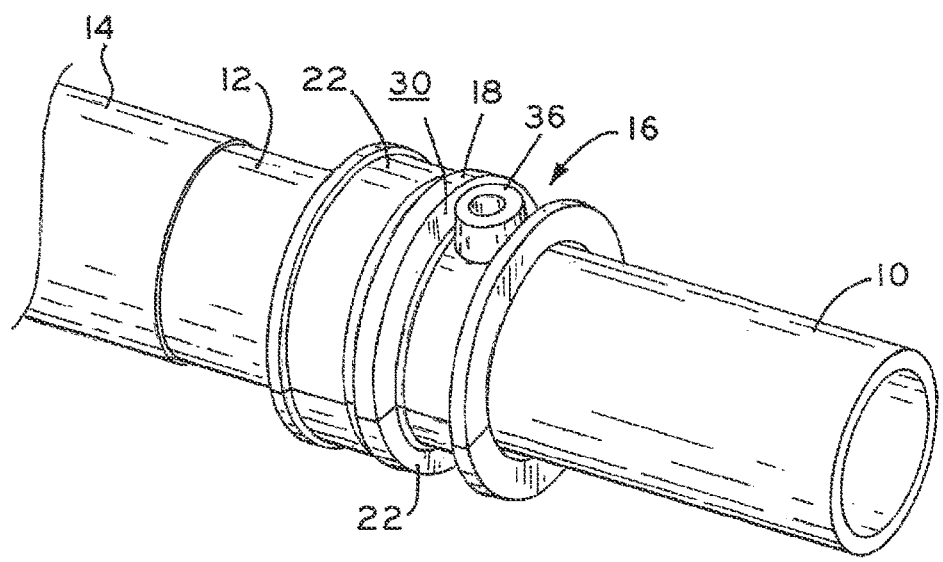
FIG. 2 is a partial perspective view of the double walled pipe of FIG. 1 illustrating a split boot assembly secured thereto.
Figure 3:
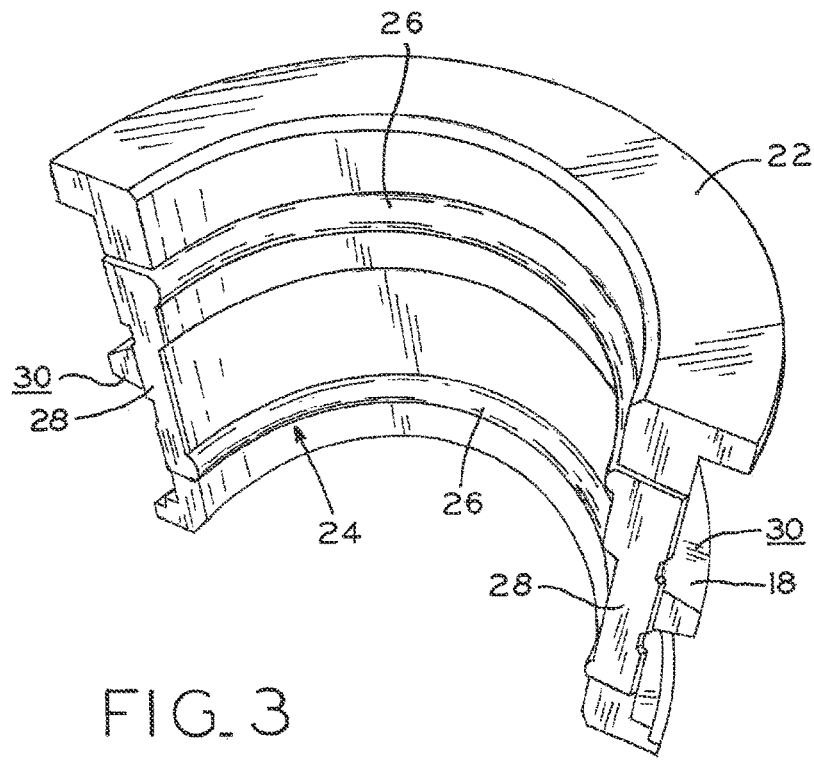
FIG. 3 is a half section of a split boot assembly in accordance with an exemplary embodiment of the present disclosure, including a rigid containment housing and an elastomeric seal.
Figure 4:
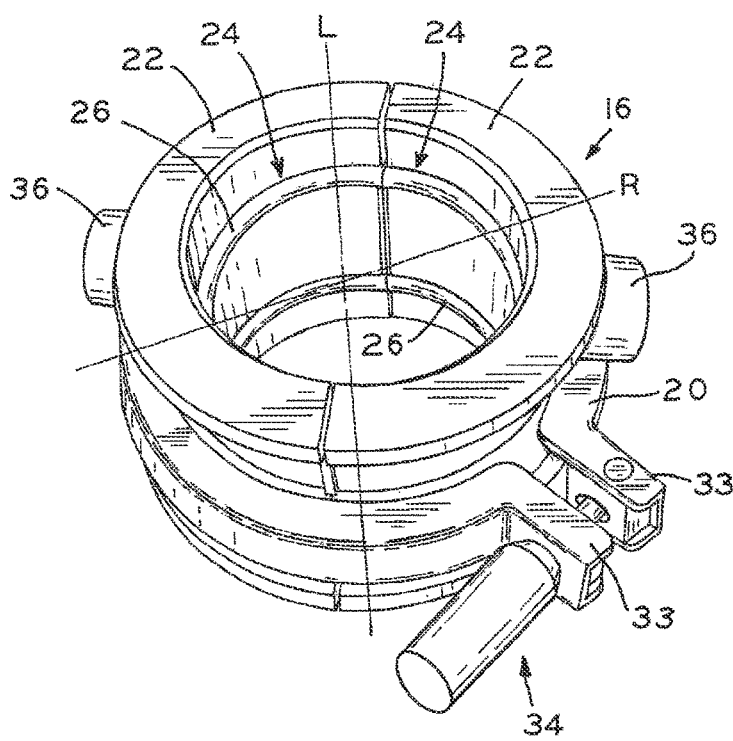
FIG. 4 illustrates a split boot assembly in operative form with a tapered clamp securing a pair of containment housings to form two continuous seals.

Split boot assembly 16 is shown in FIG. 2 assembled to the piping system. Split boot assembly 16 is located in such a position as to be capable of providing a seal between boot assembly 16 and primary pipe 10 on one end and boot assembly 16 and secondary pipe 12 on the second end. Centrally located on split boot assembly 16 is ring 18 for positioning tapered clamp 20 (FIG. 4). FIG. 3 illustrates a half section of boot assembly 16 that includes rigid containment housing 22 and elastomeric seal 24. Housing 22 and seal 24 are constructed such that when combined with a similar half section can form a leak tight seal of the secondary containment volume, i.e., the interstitial space defined between primary pipe 10 and secondary pipe 12. Specifically, elastomeric seal 24 includes O-ring, quad-ring, or dual-lobed over molded seal halves 26 connected by flat gasket sections 28.

FIG. 3 illustrates a half section of boot assembly 16 that includes rigid containment housing 22 and elastomeric seal 24. Containment housing 22 may include a cavity or indentation sized to closely match the outer contours of elastomeric seal 24. In certain embodiments, elastomeric seal 24 may be interference fit into such a cavity, with a portion of the seal exposed to effect sealing as described herein. In embodiments of the present disclosure, containment housing 22 is formed of plastic such as high density polyethylene (HDPE), e.g., PE 100. Glass reinforced polymers and nylons may also be used to form containment housing 22. Elastomeric seal 24 can be formed of a variety of materials routinely used for sealing in the petroleum industry, such as various rubber and rubber compounds. Housing 22 and seal 24 are constructed such that when combined with a similar half section can form a leak tight seal of the secondary containment volume. Specifically, elastomeric seal 24 includes O-ring halves 26 connected by flat gasket sections 28. In an exemplary embodiment, and as illustrated in FIGS. 4, 9 and 16-19, each section of split boot assembly 16 may be formed by a containment housing extending no more than 180° about the longitudinal axis of split boot assembly 16 (which, will be generally coincident with the longitudinal axis of primary pipe 10, in use).

As shown in FIG. 4, split boot assembly 16 is assembled and secured with tapered clamp 20. When tightened, tapered clamp 20 ensures alignment of the two half sections of boot assembly 16 along both longitudinal axis L and radial axis R while providing compression of the assembly and, consequently, compression of elastomeric seals 24 against primary pipe 10 and secondary pipe 12.

Since tapered clamp 20 provides both axial and radial alignment, the ends of the seal assembly form together in order to create a single seal path that duplicates the function of a full O-ring, quad-ring, or dual-lobed over molded seal with two half O-ring seals on each end of the split boot. This enhanced alignment ensures proper sealing.

The ends of the half O-rings 26 are attached to flat gasket sections 28 that are used to contain and position the ends of the half O-rings and provide for sealing therebetween. In an embodiment of the present disclosure, when the halves of split boot assembly 16 are secured in operable relationship to primary pipe 10 and secondary pipe 12 to provide sealing therebetween, flat gasket sections 28 of the two elastomeric seals 24 are sealingly pressed against each other so that associated pairs of half O-rings 26 of the two elastomeric seals 24 form a seal about the entire circumference of the pipe against which they are positioned. This cooperation of the two elastomeric seals 24 to form a continuous seal through the split in split boot assembly 16 is illustrated in FIG. 4. In this way, the two elastomeric seals 24 cooperate to form two continuous sealing surfaces about a full 360 degrees of rotation.

In order to maximize the performance of the sealing interface between the two half O-rings, it is envisioned that small raised crescent rings could be included to ensure concentrated sealing at the edges of the O-ring.

Figure 5:
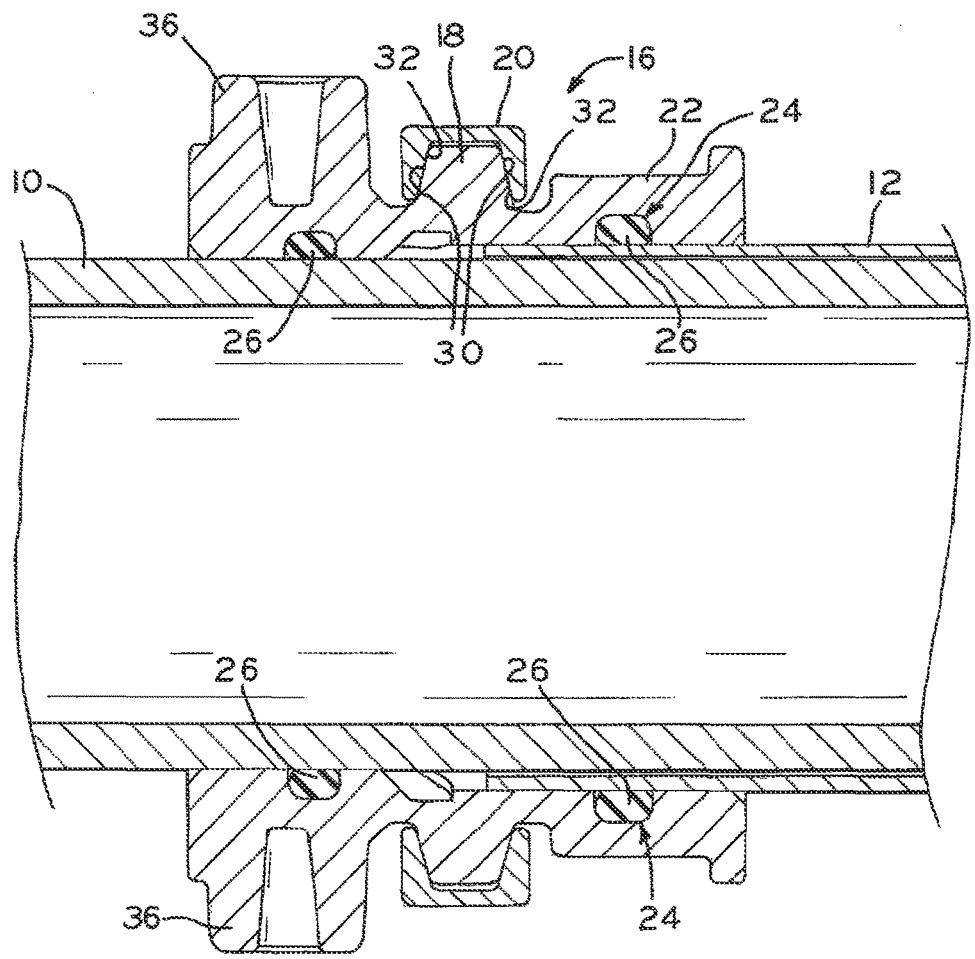
FIG. 5 is a cross-sectional view illustrating the split boot assembly of the present disclosure secured to a double walled pipe assembly.

Referring to FIG. 5, a half section of boot assembly 16 is illustrated in a sealing configuration with primary pipe 10 and secondary pipe 12. FIG. 5 illustrates the two internal diameters of each half section of boot assembly 16 which allow for placement of split boot assembly 16 in close proximity to primary pipe 10 and secondary pipe 12 simultaneously. As illustrated in FIG. 5, ring 18 extends radially outwardly from the outer diameter of rigid containment housing 22 of each half of split boot assembly 16 and includes a pair of outwardly facing ramp surfaces 30. Similarly, tapered clamp 20 includes interior ramp surfaces 32. When assembled, ramp surfaces 30 and ramp surfaces 32 form a similar or, in certain circumstances, identical angle relative to radial axis R, which, in use, is oriented perpendicular to the longitudinal axis L of primary pipe 10 and secondary pipe 12 and illustrated in FIG. 4.

Referring to FIG. 4, tapered clamp 20 includes ends 33 which can be brought together to compress tapered clamp 20 against a pair of half sections of boot assembly 16 to tightly secure split boot assembly 16 to primary pipe 10 and secondary pipe 12 as illustrated in FIG. 5. Tapered clamp 20 may be flexible enough so that ends 33 may be sufficiently separated to allow tapered clamp 20 to be positioned about the exterior of split boot assembly 16. Alternatively, tapered clamp 20 may be formed by two clamp halves which are hingedly connected at a position spaced, e.g., 180° from ends 33 to allow for tapered clamp 20 to be opened and positioned about split boot assembly 16. FIG. 17 illustrates an exemplary hinge 72. With tapered clamp 20 positioned about split boot assembly 16, ends 33 of tapered clamp 20 may be pulled together so that ramp surfaces 32 of tapered clamp 20 act against ramp surfaces 30 of ring 18 to both radially and axially align the halves of split boot assembly 16 as described above. Tapered clamp 20 is sized such that it will provide compressive force about the entire perimeter of split boot assembly 16 and to the seals positioned therein. Ramp surfaces 32 of tapered clamp 20 and ramp surfaces 30 of ring 18 can be symmetrical relative to a radial axis to facilitate radial and axial alignment of the halves of split boot assembly 16. A variety of fasteners, such as a lag bolt/nut (e.g., a wing nut) may be utilized to pull ends 33 toward one another to effect compression of split boot assembly 16 and bring split boot assembly 16 into sealing engagement with primary pipe 10 and secondary pipe 12.

In certain embodiments, split boot assembly 16 includes fitting 36 to allow for connection to a port fluidly connected to an interstitial space formed between primary pipe 10 and secondary pipe 12 and facilitate VPH monitoring. This is further illustrated in FIG. 15.

Figure 6:
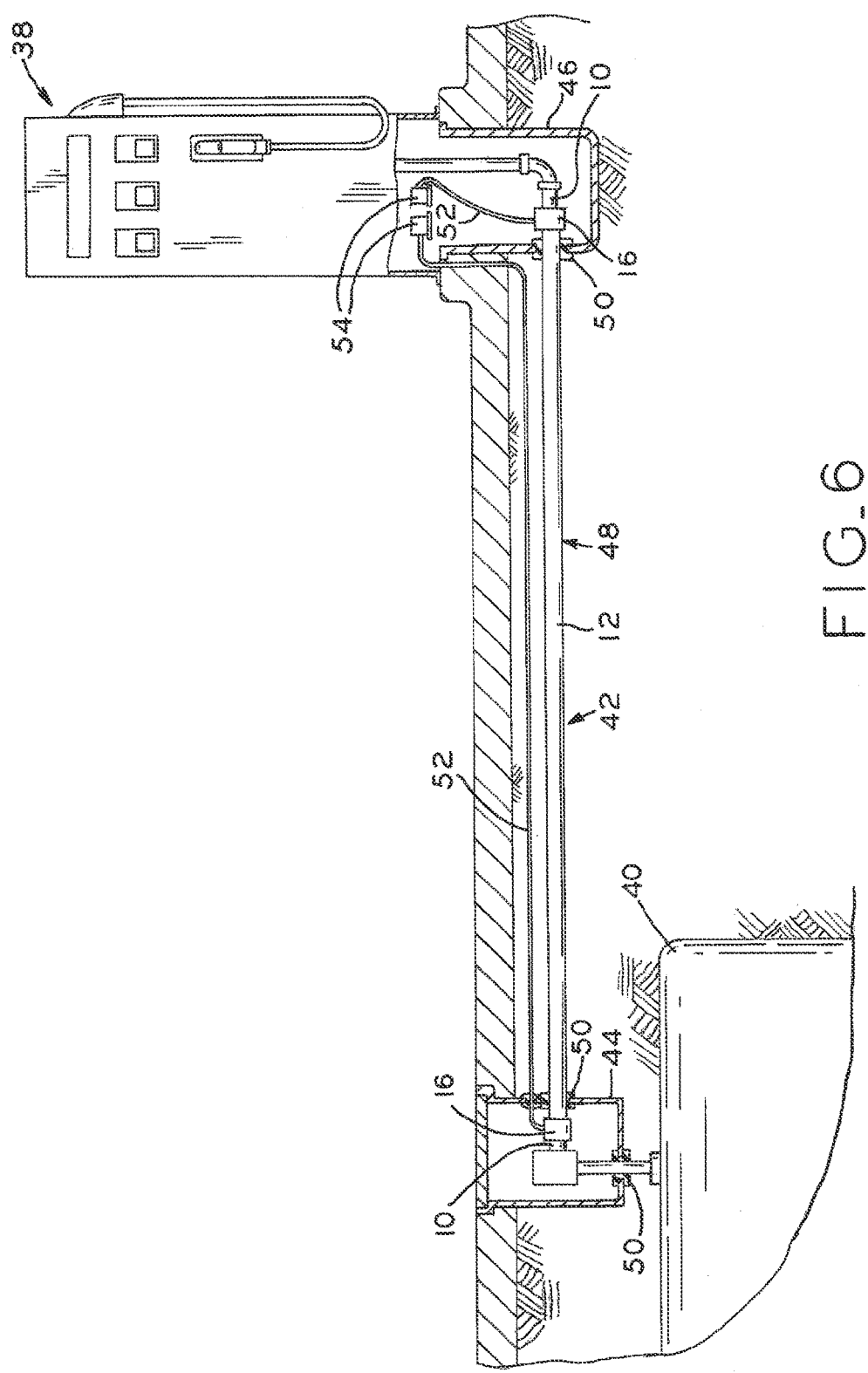
FIG. 6 is a representation of a fueling station illustrating connection of a fuel dispenser to an underground storage tank.

FIG. 6 schematically illustrates components of a fuel station including fuel dispenser 38, underground storage tank 40 and underground piping system 42. In this arrangement, underground piping system 42 fluidly connects fuel dispenser 38 to underground storage tank 40 so that fuel stored in underground storage tank 40 may be dispensed to vehicles via the nozzle of fuel dispenser 38. To effect fluid connection of underground storage tank 40 to fuel dispenser 38, primary pipe 10 maintains connection to and allows fluid communication between underground storage tank 40 and fuel dispenser 38. In prior configurations utilizing a full (non-split) test boot, primary pipe 10 would have to be disconnected from the piping system fluidly connecting underground storage tank 40 to fuel dispenser 38 to allow for replacement of a damaged test boot. Advantageously, the split test boot of the present disclosure does not require disconnection of primary pipe 10 to allow for replacement of a damaged split test boot.

In the exemplary embodiment illustrated, underground piping system 42 comprises double walled pipe as previously described. In addition to secondary pipe 12, tank sump 44 and dispenser sump 46 form a part of a secondary containment system. Tank sump 44 contains an access for filling underground storage tank 40 as well as piping (primary pipe 10) for conveying fuel from underground storage tank 40 to fuel dispenser 38. Underground piping system 42 includes double walled pipe 48 spanning tank sump 44 and dispenser sump 46, with secondary pipe 12 terminating at either end in tank sump 44 and dispenser sump 46. Primary pipe 10 fully extends from underground storage tank 40 to dispenser 38. Secondary pipe 12 terminates within tank sump 44 and dispenser sump 46 at split boot assemblies 16. In alternative embodiments, secondary pipe 12 does not terminate at a test boot but rather terminates within the respective sump so that any fluid flowing in the interstitial space between primary pipe 10 and secondary pipe 12 will be collected in one of tank sump 44 and dispenser sump 46. To seal against leaks, tank sump 44 and dispenser sump 46 employ penetration seals 50. These sump penetration seals can take the form of those disclosed in U.S. Patent Application Publication No. 2009/0136286 and U.S. Pat. Nos. 7,758,084 and 7,523,962, the entire disclosures of which are hereby expressly incorporated by reference herein.

To convey fuel contained in underground storage tank 40 to fuel dispenser 38 via primary pipe 10, a pump may be positioned in tank sump 44 or be submersed in underground storage tank 40.

To monitor for leaks in double walled pipe 48, split boot assemblies 16 may be communicatively connected via connections 52 to monitoring system 54. Monitoring system 54 may form a part of a leak detection system such as the leak detection system disclosed in U.S. Pat. Nos. 7,334,456 and 7,051,579, both entitled "Method and Apparatus for Continuously Monitoring Interstitial Regions in Gasoline Storage Facilities and Pipe Lines", the entire disclosures of which are hereby expressly incorporated by reference herein.

Figure 7:
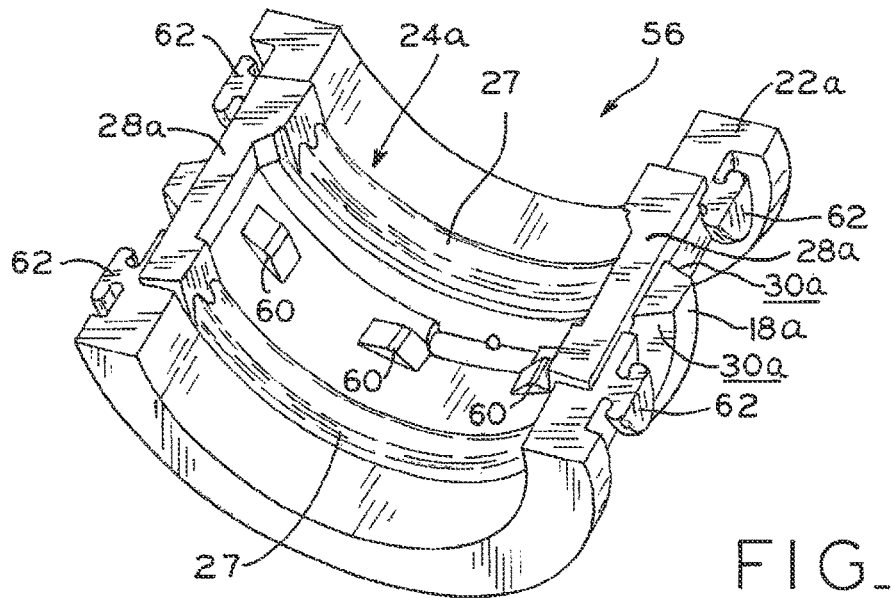
FIG. 7 is an illustration of an alternative embodiment split boot half in accordance with the present disclosure.

FIG. 7 illustrates boot half 56, a pair of which cooperate to form a split boot assembly. Boot half 56 illustrated in FIG. 7 forms a part of an alternative embodiment split boot assembly such as split boot assembly 16a illustrated in FIGS. 15-19. Split boot assembly 16a shares many common features with split boot assembly 16 described above. Shared features are denoted with the same reference number followed by a reference letter.

Figure 8:
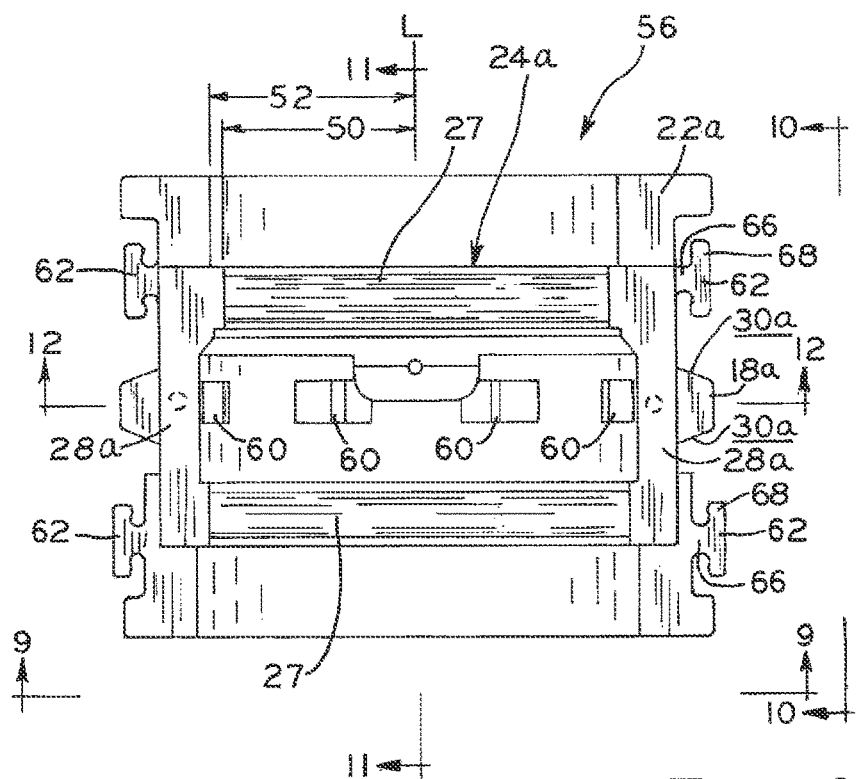
FIG. 8 is a radial elevational view of the split boot half illustrated in FIG. 7.
Figure 9:
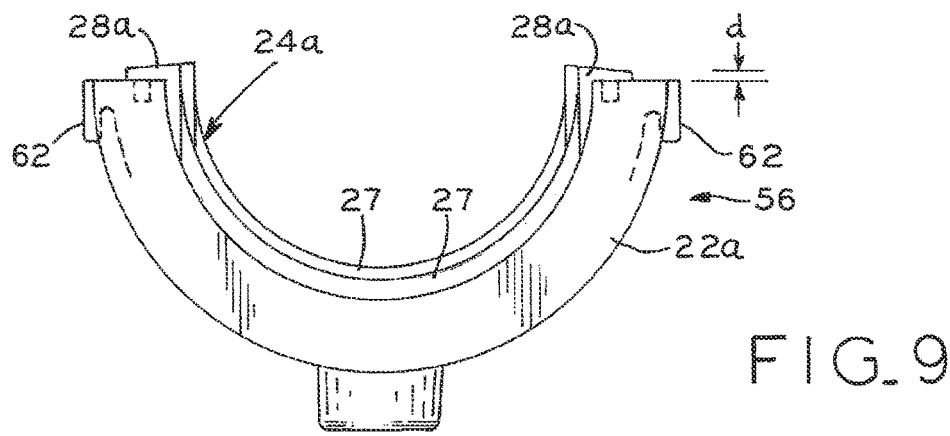
FIG. 9 is an axial elevational view of the split boot half illustrated in FIG. 7.
Figure 11:
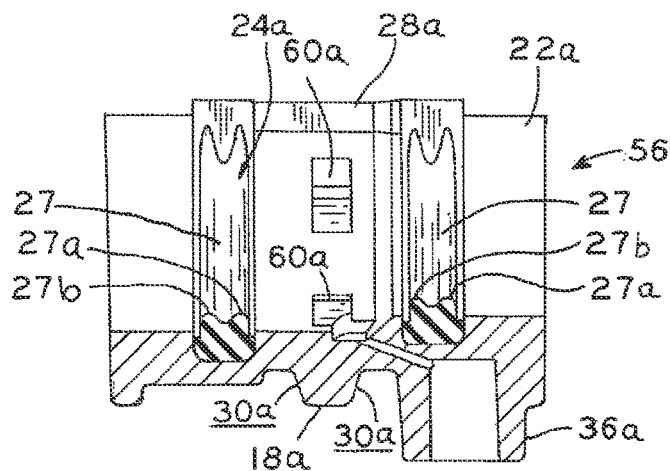
FIG. 11 is a sectional view of the split boot half illustrated in FIG. 10.

Referring to FIG. 11, boot half 56 includes a pair of seal halves 27. Seal halves 27 perform the same function as O-ring halves 26 described above and are secured to rigid containment housing 22a in the same fashion as O-ring halves are secured to rigid containment housing 22. Unless specified, split boot assemblies 16, 16a share common features and functionality, and are assembled in the same way. Seal halves 27 each include dual sealing surfaces 27a, 27b extending radially inward therefrom. Sealing surfaces 27a, 27b are, in use, pressed against one of primary pipe 10 and secondary pipe 12 to form a sealing engagement therewith. As with O-ring halves 26 described above, seal halves 27 are joined by flat gasket sections 28a as illustrated in FIGS. 7-9.

Flat gasket section 28a is illustrated in detail in FIG. 14. As illustrated in FIG. 14, flat gasket section 28a includes seal surface 29. Seal surface 29 extends upwardly from junction surface 58 of boot half 56 and forms an angle α therewith. In one exemplary embodiment, angle α measures 6°. In this embodiment, more material compression is experienced at a radially inward most portion of adjacent to sealing surfaces 27a, 27b when a pair of boot halves 56 are joined together to form split boot assembly 16a, whereas less material is compressed at a radially outward most portion of sealing surfaces 27a, 27b. In this way, angling of seal surface 29 provides maximum sealing adjacent to primary pipe 10 and secondary pipe 12. In an exemplary embodiment, seal surface 29 forms an angle θ with a surface of flat gasket section 28a opposite seal surface 29. In one exemplary embodiment angle θ measures 12°. This 12° angle provides additional material at a radially inward position of flat gasket section relative to a radially outwardly position to allow for further compression of flat gasket section 28a at a radially inward most position of seal surfaces 29 of seal halves 27. As illustrated in FIG. 14, containment housing 22a may include a bevelled surface to accommodate angle θ. As illustrated in FIG. 7, sealing surfaces 27a, 27b transition from the raised convex surfaces illustrated in FIG. 11 to a flattened section adjacent to flat gasket sections 28a to further provide additional surface area for sealing between adjacent flat gasket sections 28a on a pair of elastomeric seals 24a.

FIG. 13 is an axial elevational view of elastomeric seal 24a of one exemplary embodiment of the present disclosure. As illustrated in FIG. 13, elastomeric seal 24a includes an inner diameter having a center which is eccentric to the center of the radius of the outer diameter of elastomeric seal 24a. Owing to this eccentricity, thickness T2 of each seal half 27 is greater than thickness T1, with T2 being the thickest part of seal half 27 and positioned 90° from seal surface 29. Elastomeric seal 24a is particularly useful for sealing a primary pipe and/or a secondary pipe which is out of round. Specifically, if the primary pipe and/or the secondary pipe which is to be sealed by split boot assembly 16a has been made oblong due to deformation thereof, split boot assembly 16a may be positioned thereabout such that thickness T2 is positioned adjacent to the short radial axis of the oblong pipe. In this way, more robust sealing can be achieved. Referring to FIG. 12, the center of the radial channel into which seal halves 27 are positioned corresponds with the center of the outer diameter of seal half 27. Therefore, the center of the inner diameter of seal half 27 is eccentric to the center of the radius of the groove formed in boot half 56 into which seal half 27 is positioned. In this way, the inner diameter of seal half 27 protrudes further radially inwardly at a position 90° from flat gasket sections 28a than at a position adjacent to flat gasket sections 28 to further facilitate sealing a pipe that is out of round as described above. Further, if thickness T2 is positioned adjacent to the long axis of a pipe that is out of round, the increased thickness of elastomeric seal 24a will provide significant forces along the long axis to urge the pipe back to round.

Double walled pipe 48 can be made in accordance with the disclosure of U.S. Pat. No. 5,865,216, issued Feb. 2, 1999 and entitled SYSTEM FOR HOUSING SECONDARILY CONTAINED FLEXIBLE PIPING, the entire disclosure of which is expressly incorporated by reference herein. Additionally, pipes used with the test boot of the present disclosure may be made from Nylon-12. Further, pipes used with the test boot of the present disclosure may be made in accordance with the disclosure of U.S. Pat. Nos. 5,297,896 and 5,527,130, issued Mar. 29, 1994 and Jun. 18, 1996, respectively and both entitled ENVIRONMENTALLY SAFE UNDERGROUND PIPING SYSTEM, the entire disclosures of which are hereby explicitly incorporated by reference herein. Further, pipes used with the test boot of the present disclosure may be made in accordance with the disclosures of U.S. Pat. No. 6,029,505 issued Feb. 29, 2000, U.S. Pat. No. 5,911,155 issued Jun. 8, 1999 and U.S. Pat. No. 5,398,976 issued Mar. 21, 1995 each entitled CONNECTING DEVICE FOR PIPE ASSEMBLIES, the entire disclosures of which are hereby explicitly incorporated by reference herein. Additionally, pipes used with the test boot of the present disclosure may be made in accordance with the disclosure of U.S. Pat. No. 5,590,981 issued Jan. 7, 1997 and entitled DOUBLE-CONTAINMENT UNDERGROUND PIPING SYSTEM, the entire disclosure of which is expressly incorporated by reference herein. Further, pipes used with the test boot of the present disclosure may be made in accordance with the disclosure of U.S. Pat. No. 6,116,817 issued Sep. 12, 2000 and entitled HYDROCARBON FUEL PIPING SYSTEM WITH A FLEXIBLE INNER PIPE AND AN OUTER PIPE, the entire disclosure of which is expressly incorporated by reference herein.

While the exemplary embodiment elastomeric seal 24a of the present disclosure is formed with a constant inner diameter (along seal surfaces 27a and 27b) and a constant outer diameter positioned within a constant diameter groove formed in rigid containment housing 22, a seal of variable inner and/or outer diameter may be employed to achieve variable radial extension toward a longitudinal axis of the test boot and/or variable seal thickness about the circumference of the seal.

Figure 10:
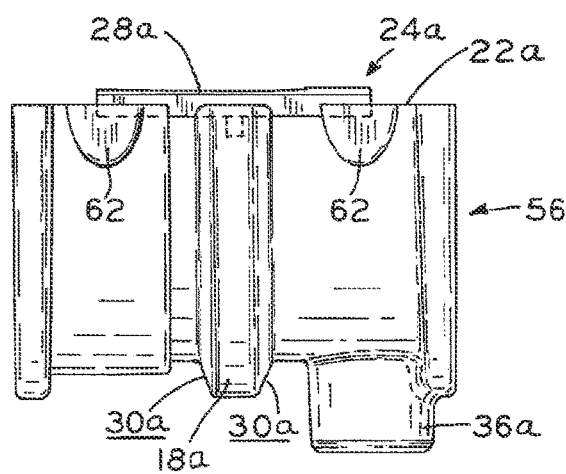
FIG. 10 is another radial elevational view of the split boot half illustrated in FIG. 7.

As illustrated in FIGS. 9 and 10, flat gasket section 28a extends a distance d from the terminal end of a half of split boot assembly 16a. In one exemplary embodiment, distance d is 0.06 inches at the radially outward most point of flat gasket section 28a. This thickness, coupled with the angular orientation of flat gasket sections 28a described above allows split test boot assembly 16 to be utilized with a variety of pipe sizes by providing a collapsible zone that can be sealed at less compression on the largest pipes and full compression on the smallest pipes within the tolerance.

Figure 15:
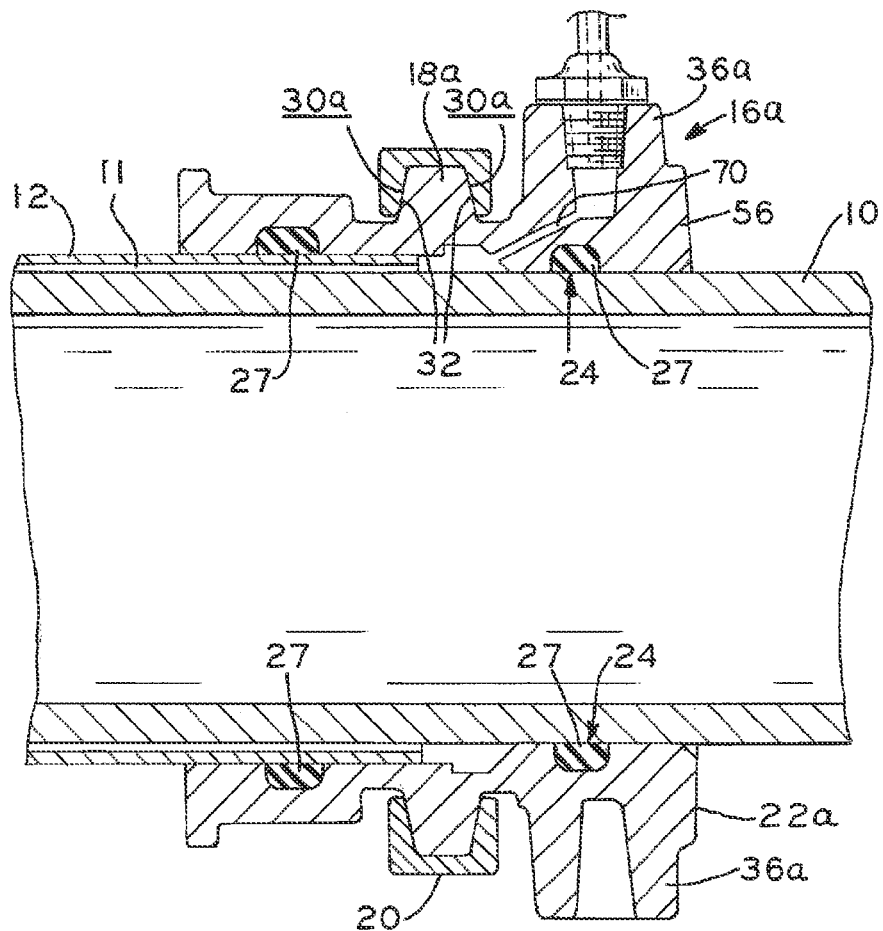
FIG. 15 is a cross-sectional view illustrating an embodiment of the split boot assembly of the present disclosure assembled to a double walled pipe.

FIG. 15 is a cross-sectional view illustrating boot half 56 secured about primary pipe 10 and secondary pipe 12 to seal interstitial space 11 therebetween. FIG. 15 illustrates the varying inner diameters of seal halves 27. These varying diameters are represented by radiuses R1, R2 measured from longitudinal axis L in FIG. 8. As illustrated, one of seal halves 27 protrudes further radially inward than the other seal half. The seal half which protrudes the furthest in a radially inward direction is associated with primary pipe 10, while the other seal half is associated with secondary pipe 12. In this way, consistent sealing against primary pipe 10 and secondary pipe 12 can be achieved. FIG. 15 further illustrates fitting 36 fluidly connected via channel 70 to interstitial space 11 to allow for connection of a monitoring system to interstitial space 11. In an alternative ("open-type") embodiment, piping may be connected to fitting 36 so that any fluid contained within interstitial space 11 may be discharged into the relevant sump.

FIG. 12 illustrates locators 60 which protrude radially inwardly from an inner wall of boot half 56. Locators 60 are useful in positioning primary pipe 10. Specifically, primary pipe 10 bears against the radially inward surfaces of locators 60. Further, locators 60 may serve as an axial stop for the insertion of secondary pipe 12 into split boot assembly 16a.

Figure 18:
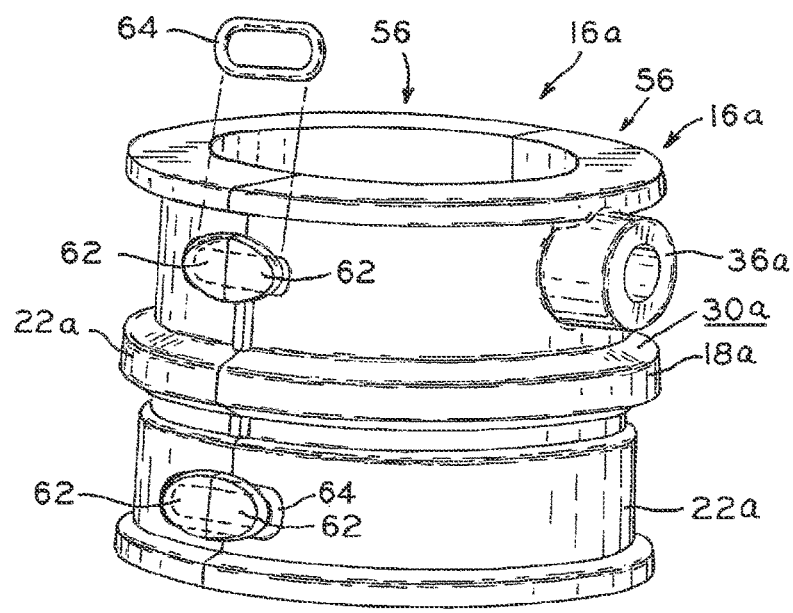
FIG. 18 is a perspective view illustrating an alternative embodiment split boot assembly in accordance with the present disclosure.
Figure 19:
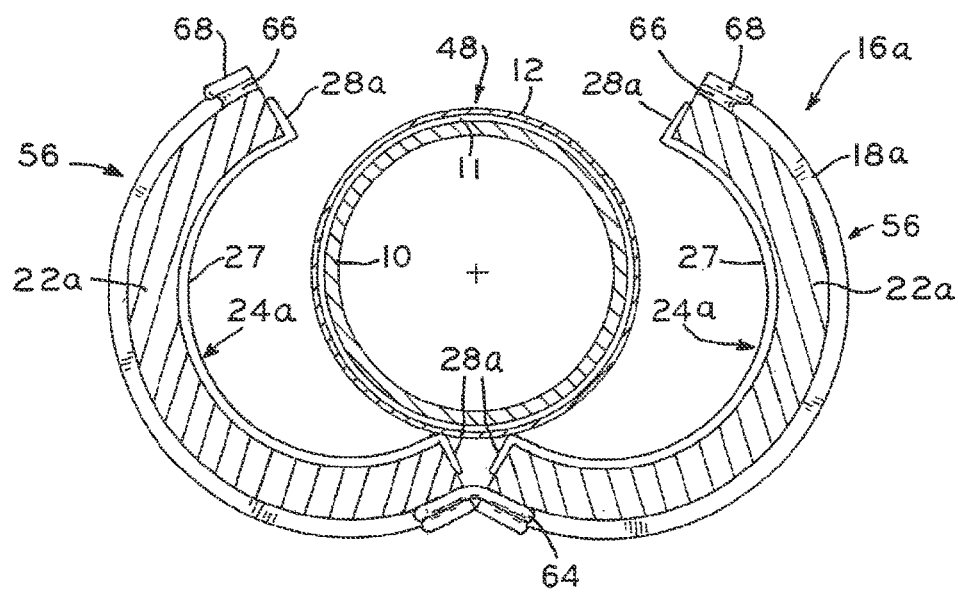
FIG. 19 is a cross-sectional view illustrating assembly of a pair of hingedly connected container housings to a double walled pipe.

As illustrated in FIGS. 7-10 and 16-19, each boot half 56 includes a pair of radially outward T-shaped extensions 62 at each terminal end thereof. Referring to FIG. 18, when a pair of boot halves 56 are joined to form a complete split boot assembly 16a, O-rings 64 can be positioned over adjacent T-shaped extensions 62 on each boot half 56. To facilitate positioning of split boot assembly 56 about double walled pipe 48, a pair of O-rings 64 can be positioned about T-shaped extension 62 at one of the two terminal ends of boot halves 56. As illustrated in FIG. 19, this allows for hinging of boot halves 56 relative to each other to facilitate positioning of split boot assembly 16a about double walled pipe 48. When a pair of boot halves 56 are positioned in the desired position, a second pair of O-rings 64 can be positioned about the remaining pairs of T-shaped extensions 62 to temporarily hold split boot assembly 16a in position while tapered clamp 20 is being positioned as described above.

O-rings 64 are sized to fit snugly about a pair of adjacent upstanding legs 66 of T-shaped extensions 62, but have sufficient resiliency to allow expansion to a size to be pulled over transverse leg 68 of one of a pair of adjacent T-shaped extensions 62 while positioned adjacent to the upstanding leg (66) of the other of the adjacent T-shaped extensions. Once seated about a pair of adjacent upstanding legs 66 of a pair of adjacent T-shaped extensions 62 as illustrated, e.g., in FIGS. 21, 23 and 24, O-rings 64 have sufficient resiliency to allow boot halves 56 to hinge relative to each other as illustrated in 24. This hinging of boot halves 56 allows boot halves 56 to be easily positioned about double walled pipe 48 in the tight confines of a sump 44, 46.

While described with reference to a boot embodiment formed of two halves, the split boot of the present disclosure could be split into any multiple of pieces, if desired. Further the pieces of the split test boot of the present disclosure could be interconnected by, e.g., a living hinge, such that the portions of the split test boot are not discreet from one another, but rather are integrally connected by the living hinge, which forms a part of two portions of a test boot body, but which is sufficiently resilient to allow one portion of the split test boot body to hinge relative to another portion of the split test boot body.

While the present disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains.

What is claimed is:

1. A seal for sealing an interstitial space formed between a primary pipe and a secondary pipe positioned about the primary pipe, the seal comprising:
   a first containment housing supporting a first seal, said first seal comprising a first pair of partial ring shaped seals, said first pair of partial ring shaped seals each forming a partial ring;
   a second containment housing supporting a second seal, said second seal comprising a second pair of partial ring shaped seals; and
   a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, wherein said first pair of partial ring shaped seals span a first gasket and a second gasket, said first pair of partial ring shaped seals joined by said first gasket and said second gasket, said second pair of partial ring shaped seals span a third gasket and a fourth gasket, said second pair of partial ring shaped seals joined by said third gasket and said fourth gasket, said clamp sealingly engaging said first gasket to said third gasket and said second gasket to said fourth gasket to form said pair of continuous ring shaped sealing surfaces.

2. The seal of claim 1, wherein said first gasket comprises a first gasket seal surface and a first gasket opposite surface opposite the first gasket seal surface, said first gasket seal surface and said first gasket opposite surface forming an angle oriented so that a thickness of said first gasket increases radially inwardly toward said containment housing longitudinal axis.

3. The seal of claim 2, wherein said third gasket comprises a third gasket seal surface and a third gasket opposite surface opposite the third gasket seal surface, said third gasket seal surface and said third gasket opposite surface forming an angle oriented so that a thickness of said third gasket increases radially inwardly toward said containment housing longitudinal axis.

4. The seal of claim 2, wherein said first containment housing includes a cavity sized to receive said first seal, said cavity including a beveled surface to accommodate said angle.

5. The seal of claim 1, wherein each of said first pair of partial ring shaped seals comprises an O-ring and each of said second pair of partial ring shaped seals comprises an O-ring.

6. The seal of claim 1, wherein each of said first pair of partial ring shaped seals comprises a dual lobed sealing ring presenting a pair of sealing surfaces and each of said second pair of partial ring shaped seals comprises a dual lobed sealing ring presenting a pair of sealing surfaces.

7. The seal of claim 1, wherein said first containment housing includes a first pair of T-shaped protrusions extending from an exterior wall of said first containment housing and said second containment housing includes a second pair of T-shaped protrusions extending from an exterior wall of said second containment housing, said seal further comprising a first pair of O-rings, each of said first pair of O-rings positioned about one of said first pair of T-shaped protrusions and one of said second pair of T-shaped protrusions to hingedly connect said first containment housing to said second containment housing.

8. The seal of claim 1, wherein said first containment housing extends no more than 180.degree. about said containment housing longitudinal axis and said second containment housing extends no more than 180.degree. about said containment housing longitudinal axis.

9. A seal for sealing an interstitial space formed between a primary pipe and a secondary pipe positioned about the primary pipe, the seal comprising:
   a first containment housing supporting a first seal, said first seal comprising a first pair of partial ring shaped seals, said first pair of partial ring shaped seals each forming a partial ring;
   a second containment housing supporting a second seal, said second seal comprising a second pair of partial ring shaped seals; and
   a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, wherein said first continuous ring shaped sealing surface defines a first radius measured from said containment housing longitudinal axis and said second continuous ring shaped sealing surface defines a second radius measured from said containment housing longitudinal axis, said first radius smaller than said second radius, whereby said first continuous ring shaped sealing surface and said second continuous ring shaped sealing surface can simultaneously sealingly engage two differently sized pipes.

10. The seal of claim 9, wherein said first containment housing includes a locator extending from an interior wall of said first containment housing toward said containment housing longitudinal axis, said locator extending further inwardly toward said containment housing longitudinal axis than said second continuous ring shaped sealing surface.

11. A seal for sealing an interstitial space formed between a primary pipe and a secondary pipe positioned about the primary pipe, the seal comprising:
a first containment housing supporting a first seal, said first seal comprising a first pair of partial ring shaped seals, said first pair of partial ring shaped seals each forming a partial ring;
a second containment housing supporting a second seal, said second seal comprising a second pair of partial ring shaped seals; and
a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, wherein each of said first pair of partial ring shaped seals has a first thickness spaced from a second thickness, said second thickness greater than said first thickness.

12. The seal of claim 11, wherein each of said second pair of partial ring shaped seals has a third thickness spaced from a fourth thickness, said fourth thickness greater than said third thickness.

13. The seal of claim 12, wherein said fourth thickness is positioned 180° about said containment housing longitudinal axis from said second thickness when said first containment housing and said second containment housing are in said secured position.

14. The seal of claim 12, wherein each of said first pair of partial ring shaped seals defines a first partial ring shaped seal inner diameter and a first partial ring shaped seal outer diameter, said first partial ring shaped seal inner diameter eccentric to said first partial ring shaped seal outer diameter, and each of said second pair of partial ring shaped seals defines a second partial ring shaped seal inner diameter and a second partial ring shaped seal outer diameter, said second partial ring shaped seal inner diameter eccentric to said second partial ring shaped seal outer diameter.

15. The seal of claim 11, wherein each of said first pair of partial ring shaped seals defines an inner diameter and an outer diameter, said inner diameter eccentric to said outer diameter.

16. A seal for sealing an interstitial space formed between a primary pipe and a secondary pipe positioned about the primary pipe, the seal comprising:
a first containment housing supporting a first seal, said first seal comprising a first pair of partial ring shaped seals, said first pair of partial ring shaped seals each forming a partial ring;
a second containment housing supporting a second seal, said second seal comprising a second pair of partial ring shaped seals; and
a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, wherein said first containment housing includes a first containment housing external radial protrusion and said second containment housing includes a second containment housing external radial protrusion, said first containment housing external radial protrusion aligning with said second containment housing external radial protrusion when said first containment housing and said second containment housing are in said secured position, said first containment housing external radial protrusion and said second containment housing external radial protrusion both having opposing ramp surfaces, so that a thickness of said first containment housing external radial protrusion and said second containment housing external radial protrusion increases radially inwardly toward said containment housing longitudinal axis, said clamp comprising a pair of interior ramp surfaces complementary to said opposing ramp surfaces of said first containment housing external radial protrusion and said second containment housing external radial protrusion, wherein said interior ramp surfaces of said clamp act against said opposing ramp surfaces of said first containment housing external radial protrusion and said second containment housing external radial protrusion to both axially and radially align said first containment housing with said second containment housing as said clamp secures said first containment housing and said second containment housing in said secured position.

17. A seal for sealing an interstitial space formed between a primary pipe and a secondary pipe positioned about the primary pipe, the seal comprising:

a first containment housing supporting a first seal, said first seal comprising a first pair of partial ring shaped seals, said first pair of partial ring shaped seals each forming a partial ring;

a second containment housing supporting a second seal, said second seal comprising a second pair of partial ring shaped seals; and a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, wherein said first containment housing further comprises a fitting extending from an exterior surface of said first containment housing and connected in fluid communication by a channel extending through a wall of said first containment housing to an interior surface of said first containment housing, said channel terminating at a location intermediate said first continuous ring shaped sealing surface and said second continuous ring shaped sealing surface.

18. A seal for sealing an interstitial space formed between a primary pipe and a secondary pipe positioned about the primary pipe, the seal comprising:

a first containment housing supporting a first seal, said first seal comprising a first pair of partial ring shaped seals, said first pair of partial ring shaped seals each forming a partial ring;

a second containment housing supporting a second seal, said second seal comprising a second pair of partial ring shaped seals; and a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, wherein said first containment housing includes a first pair of T-shaped protrusions extending from an exterior wall of said first containment housing and said second containment housing includes a second pair of T-shaped protrusions extending from an exterior wall of said second containment housing, said seal further comprising a first pair of O-rings, each of said first pair of O-rings positioned about one of said first pair of T-shaped protrusions and one of said second pair of T-shaped protrusions to hingedly connect said first containment housing to said second containment housing, wherein said first containment housing includes a third pair of T-shaped protrusions extending from said exterior wall of said first containment housing and said second containment housing includes a fourth pair of T-shaped protrusions extending from said exterior wall of said second containment housing, said seal further comprising a second pair of O-rings, each of said second pair of O-rings positioned about one of said third pair of T-shaped protrusions and one of said fourth pair of T-shaped protrusions to selectively secure said first containment housing to said second containment housing.

19. A seal for sealing an interstitial space formed between a primary pipe and a secondary pipe positioned about the primary pipe, the seal comprising:

a first containment housing supporting a first seal, said first seal comprising a first pair of partial ring shaped seals, said first pair of partial ring shaped seals each forming a partial ring;

a second containment housing supporting a second seal, said second seal comprising a second pair of partial ring shaped seals; and a clamp sized and shaped to secure said first containment housing relative to said second containment housing in a secured position in which said first pair of partial ring shaped seals of said first seal and said second pair of partial ring shaped seals of said second seal cooperate to form a pair of continuous ring shaped sealing surfaces comprising a first continuous ring shaped sealing surface comprising a first one of said first pair of partial ring shaped seals and a first one of said second pair of partial ring shaped seals, and a second continuous ring shaped sealing surface comprising a second one of said first pair of partial ring shaped seals and a second one of said second pair of partial ring shaped seals, in said secured position said first containment housing and said second containment housing defining a containment housing longitudinal axis, in combination with a fueling station comprising the primary pipe, the secondary pipe, an underground storage tank, a fuel dispenser, an underground storage tank sump and a fuel dispenser sump, the primary pipe fluidly connecting the underground storage tank with the fuel dispenser and traversing the underground storage tank sump and the fuel dispenser sump, the secondary pipe providing secondary containment of the primary pipe and extending between the underground storage tank sump and the fuel dispenser sump, the clamp securing said first containment housing relative to said second containment housing in the secured position, so that the first continuous ring shaped sealing surface seals against the primary pipe and the second continuous ring shaped sealing surface seals against the secondary pipe.

* * * * *